United States Patent [19]
Vaerman

[11] Patent Number: 4,787,814
[45] Date of Patent: Nov. 29, 1988

[54] APPARATUS FOR THE LOCATION FOR INSPECTION AND OTHER PURPOSES OF A GENERALLY CIRCULAR ARTICLE

[75] Inventor: Jean F. Vaerman, Vert-Saint-Denis, France

[73] Assignee: Societe Nationale d'Etude et de Construction de Moteurs d'Aviation "S.N.E.C.M.A.", Paris, France

[21] Appl. No.: 3,210

[22] Filed: Jan. 14, 1987

[30] Foreign Application Priority Data

Jan. 17, 1986 [FR] France ................... 86 00598

[51] Int. Cl.⁴ ............................................. B25J 11/00
[52] U.S. Cl. ................................. 414/757; 33/178 E; 33/550; 198/345; 414/754; 414/772; 414/778
[58] Field of Search ............... 414/225, 433, 751, 752, 414/753, 754, 757, 772, 776, 778; 198/345; 33/178 E, 550

[56] References Cited

U.S. PATENT DOCUMENTS

| | | | |
|---|---|---|---|
| 1,836,036 | 12/1931 | Morris. | |
| 2,421,548 | 6/1947 | Davies. | |
| 2,530,333 | 11/1950 | Jost | 414/776 X |
| 2,930,492 | 3/1960 | Metcalf | 414/754 |
| 3,297,134 | 1/1967 | Pastuszak | 414/757 X |
| 3,593,984 | 7/1971 | Carman. | |
| 4,162,018 | 7/1979 | Arya | 414/752 |

FOREIGN PATENT DOCUMENTS 1237005 3/1967 Fed. Rep. of Germany.
2335306 7/1977 France.

OTHER PUBLICATIONS

"Automatic Wafer Transfer and Turnover Tool", Western Electric Technical Digest; No. 49, Jan. 1978, pp. 1 & 2.

Primary Examiner—Leslie J. Paperner
Attorney, Agent, or Firm—Oblon, Fisher, Spivak, McClelland & Maier

[57] ABSTRACT

An apparatus for placing in location a circular article from a transport pallet and for moving the article to one or more control positions being angularly offset with respect to one another. The apparatus includes a gripping mechanism with grippers mounted on a gantry, a framework supported by a plate which can be raised and lowered, the framework including a mechanism for rotating the article about itself and leaving free an angular sector of 120° at which all the parts of the article can be presented in order to be brought up to or brought into contact with a measurement or inspection mechanism the framework also comprising a mechanism to allow for correct location in any inclined direction or vertical. The apparatus is applicable to automation of control sequences or machining sequences without manual operation or intermediate return of the article between the operations of inspection or of machining.

14 Claims, 9 Drawing Sheets

APPARATUS FOR THE LOCATION FOR INSPECTION AND OTHER PURPOSES OF A GENERALLY CIRCULAR ARTICLE

BACKGROUND OF THE INVENTION

1. Field of the Invention

The present invention relates to apparatus for the location of a generally circular article from a waiting position, for example a transport palette to one or several monitoring or machining positions of the article, these positions being angularly offset with respect to one other.

2. Description of the Prior Art

Such apparatus find advantageous application in operations for the monitoring of manufacturing processes, for example ultra-sonic monitoring for flaws of pre-machined articles, in order that these articles should not require finish machining.

In current manufacturing chains, for example for rotary parts of turbo-machines, such as turbine or compressor disks, the pre-machined disks are subjected to a monitoring or control of their various surfaces with the objective of detecting superficial or internal flaws in the material and in order to be able to determine the height, the position, the orientation and possibly the geometry of these flaws or defects in order to be able to accept or reject the article if the or each confirmed defect are of a latent nature, having regard for the predetermined acceptability criteria.

Such control or monitoring operations are currently carried out in the presence of an operator whose role consists of surveillence of the satisfactory functioning of the monitoring installation but especially to effect manually certain manipulating operations of the article, such as, for example, an inversion of two opposed surfaces of the latter must be successively presented for scanning by the ultrasonic beam emitted by a control or monitoring unit.

Such manual operations may constitute an interruption in the chain in processes where all the control operations in themselves are automatic.

In order to render such operations easier, it has been previously proposed to effect the inversion of the article externally of a control chamber with the aid of appropriate means, but this necessitates complex operations since it is necessary initially to introduce the article onto a mounting plate and lowering of the chamber, to effect the control operations on the upper face of the article, to retrieve the article by means of a roller bridge in order to move it vertically and then laterally out of the chamber in order to load it onto an external support member, invert it, then raise it up again with the roller bridge and return it to the inside of the chamber on a plate where it is then possible to effect a second control or monitoring operation on the face of the article previously facing downwardly but now located in the upper position, the article having been inverted.

SUMMARY OF THE INVENTION

The present invention seeks to avoid the manual total inversion of the article to be monitored or controlled by permitting monitoring of both the upper face and the lower face, from the outer edge or where appropriate from the bore of the article by means of an apparatus for location of the article comprising a framework on which the article is secured, the framework being rotatable about a horizontal axis through about 90° and having a disengagement facility enabling the movement towards the article of a tool, of a sensor or of an ultrasonic control unit, in all of the locations of the article. The invention also envisages a simplification of the monitoring processes by avoiding useless intermediate operations and to reduce the space taken up, the weight and the cost of the apparatus.

When it is applied to machining operations and not to operations for monitoring flaws or defects, the invention enables machining operations on two opposed faces of an article by one tool, for example a boring tool or a honing tool without intermediate operations of inversion of the article by simple rotation of the support-framework.

The invention therefore has as its object providing an apparatus for mounting and locating a circular article received from a transport pallet, the apparatus being capable of moving the article to one or more locations for inspecting, monitoring measuring or machining, the locations being angularly offset with respect to one other. The apparatus comprises in combination a gripping device with radially movable grippers mounted on a gantry movable in two orthogonal horizontal directions, a horizontal plate equipped with an intermediate support framework mounting for the article, the framework having means for enabling the approach towards the article of an inspection, monitoring or machining means.

In use, the plate is mounted on a vertical raising and lowering column which is movable from a first location where the plate is furnished with the support framework, receives a pallet loaded with the article at a second, upper, location where the article is engaged by the grippers of the gripping device, is then once again moved towards the first location where the pallet is withdrawn after lateral release from the gantry previously carrying the article, then towards the second location where the article is mounted on the plate, then towards a third location where the intermediate framework rests on a cradle carried by a fixed support, the framework being then uncoupled from the plate which is then taken towards a fourth, lower, rest location.

The intermediate framework comprises a first radial support means for centering and for rotating the article on the frame, and a second securing and locating means for the article on the frame, the second means cooperating with the upper face of the article.

According to one advantageous embodiment of the invention, the intermediate support framework of the article is constituted by three traverse radially angularly spaced by 120° forming slides for the first means for the support of the article, the outer ends of the traverses being rigid with longitudinal members forming three sides of a rectangle, the fourth side without a longitudinal member defining an angular section substantially equal to 120° which is left free in order to enable access of one or other of the faces of the articles loaded onto the framework by the monitoring or inspection member or by a machining tool.

According to one feature of the invention, the first radial support means for centering and rotating the article is constituted by three carriages radially movable in slides carried by the vertical faces of the traverses of the framework, the carriages each carrying a movable roller rotatable about an axis orthogonal to the surface of the framework, while the second securing means for locating of the article on the framework is constituted by two arms of which one end is pivoted on two supports and of which the other end comes into contact through the intermediary of three rollers with the upper face of the member, under the action of a control actuator.

In order to enable rotation of the framework supporting the article with a clearance of 90°, and in order to be able to bring the tool of the sensor of the whole of the profile of a right section of the article up to the article, the framework comprises two pivots with horizontal axes disposed on the one and on the other side of the framework on an line orthogonal to the bisector of the free sector cooperating with the fixed support cradle in order to enable the rotation of the framework and of the article from a horizontal orientation to a vertical orientation, and in a preferential manner the support comprises at least two index members for the locking of the framework in at least two angular orientationsspaced from one another.

Other features of the invention as well as modifications and applications thereof will be explained in the description which follows accompanied by drawings showing one application of the invention to the location of rotor disks of turbo-machines in an ultrasonic inspection or monitoring chamber.

DESCRIPTION OF THE PREFERRED EMBODIMENTS

Figure 1:
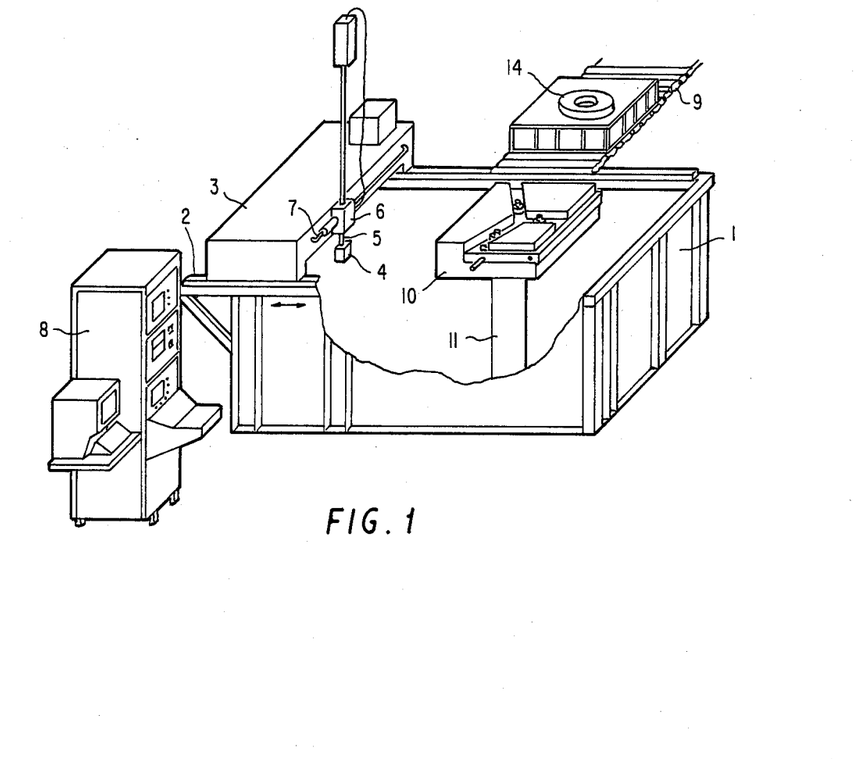
FIG. 1 illustrates an assembly of an ultrasonic control or monitoring chamber incorporating an apparatus in accordance with the present invention for locating an article.

Referring to FIG. 1, an ultrasonic monitoring chamber 1 is intended to contain an article immersed in water. On two upper parallel edges of the chamber 1, slides 2 are provided on which a gantry 3 can move which supports a sensor 4 rotatable in a vertical plane on the lower end of a vertical rod 5, itself rotatable and in vertical translation in a carriage 6. The carriage 6 is also movable in horizontal translation along a transverse slide 7 of the gantry 3. By the combined displacements of the gantry on the slides of the chamber, and of the rod 5 on the gantry, the sensor 4 can be displaced within the whole volume of the chamber 1.

In the embodiment here illustrated, the sensor 4 is constituted by the transducer of the ultrasonic monitoring device of which the pulse generator, its supply and a control device for computing and memory storage are contained within a casing 8 disposed adjacent to the chamber.

In other applications, it will be clear that the sensor 4 can be replaced by other tool members such for example as a honing head, a boring head or other machining tools. In such cases, the chamber is omitted and the slides are carried on a frame.

The apparatus, as a whole, for moving the article to a particular location comprises first of all a horizontal supply roller conveyor 9 disposed at the same level as the upper slides 2, and incorporating rollers on which the pallets supporting the articles to be monitored can be roll. The apparatus also comprises a raising and lowering plate 10 mounted on a vertical column 11 which can be indexed to different levels situated selectively at various vertical locations between two end positions, the lower one where the plate 10 is in a rest position, and the other, upper, one where the plate is in position to enable a gripping device to engage the article in order to lift it from its pallet, as will become apparent hereinafter.

Figure 2A:
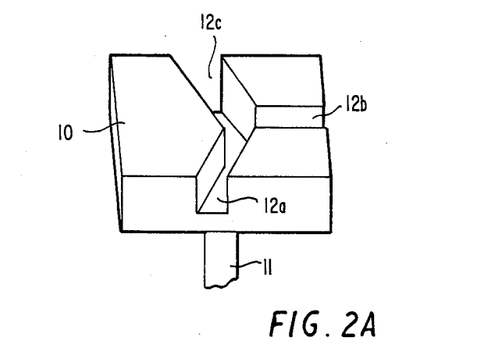
FIG. 2 illustrates the details of a mounting plate (FIG. 2a) and an intermediate frame (FIG. 2b) together with the plate when equipped with the framework (FIG. 2c)
Figure 2B:
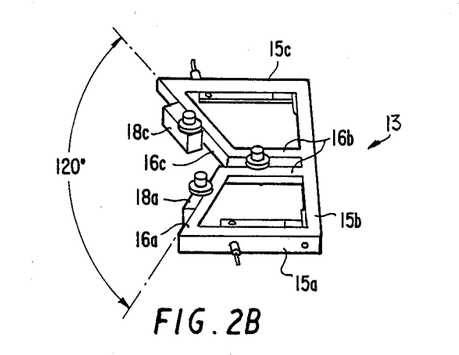
Figure 2C:
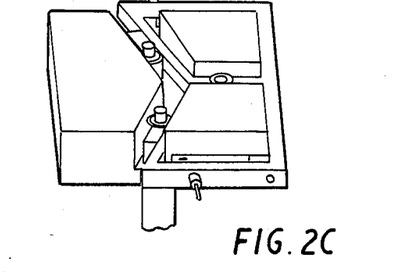

The plate 10 is generally of square shape in the embodiment illustrated in FIGS. 2a to 2c. It comprises in its upper surface a groove array 12 formed by three horizontal grooves 12a, 12b, 12c, extending along three angularly-spaced axes at 120° to each other meeting at the centre of the plate, and opening outwardly on to three lateral faces of the plate 10.

The recess array 12 is intended to receive and to carry an intermediate frame 13, shown in FIG. 2b, which will itself support the disk 14 to be controlled. The framework 13 is formed by three longitudinally-extending members 15a, 15b, 15c welded together in the form of a "squared" U, the longitudinal member 15b forming the base of the U. Three traverses 16a, 16b, 16c, radially angularly spaced by 120°, are rigid with the longitudinal members. The traverses 16a, 16b, 16c connect the otherwise free ends of the longitudinal members 15a, 15c forming the limbs of the U and one of the ends of the traverse 16b, the other end of the traverse 16b being welded to the longitudinally extending member 15b.

The framework produced from the three longitudinal members 15a, 15b, 15c and three traverses 16a, 16b, 16c thus almost forms a square and the missing side, opposite to the longitudinal member 15b, leaving free an angular sector of 120° C. (see FIG. 2b) extending to the centre of the framework where the three traverses join one another, the angular sector being left free to enable the approach or the placing in contact of the sensor 4 with one or the other faces of the disk 14 which will be mounted onto the framework.

Figure 3:
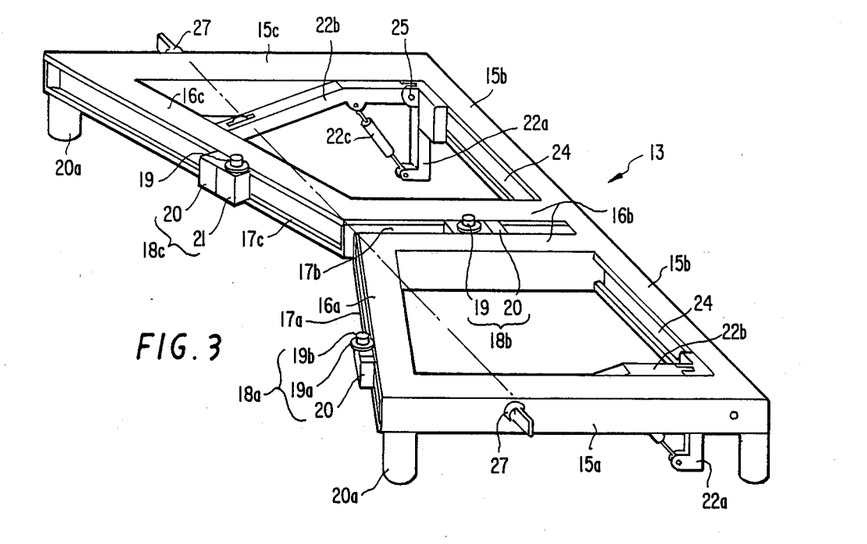
FIG. 3 shows a perspective view of the framework alone but including second securing means for the article.
Figure 4:
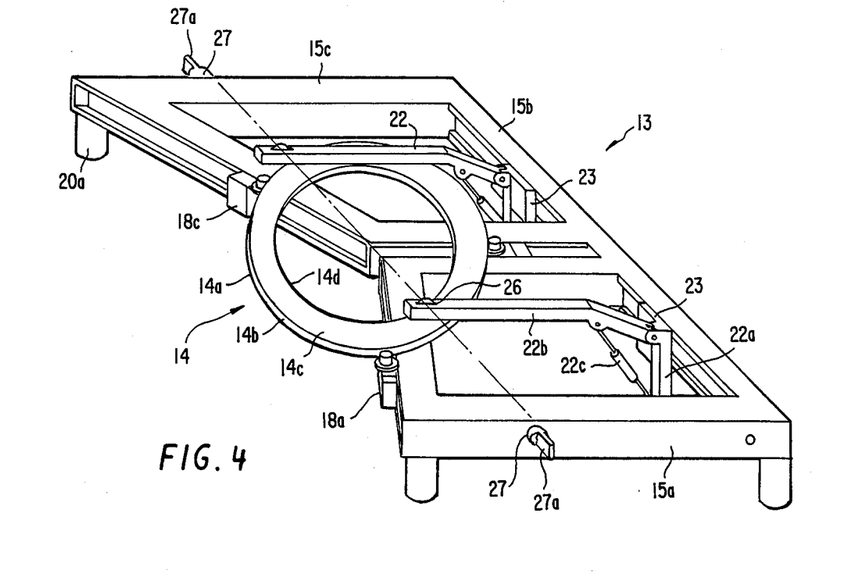
FIG. 4 illustrates a perspective view of the same framework as shown in FIG. 3, supporting an article with the first and the second securing means in operation.

As illustrated in FIG. 3, the vertical faces of the traverses 16a, 16b, and the horizontal upper face of the traverse 16c are so shaped as to define plain slides 17a, 17b, 17c or slides of dovetail section along which movable carriages 18a, 18b, 18c provided with stepping motors 20 can slide under the action of the motors. In a modification, the motors can be omitted and drive of the carriages on the slides can be effected by motors 20a actuating drive screws.

The three carriages 18a, 18b, 18c are displaceable independently of one another and can be locked in one given position separated from the one from the other by any known means, for example by locking shoes within the slide, or by eccentric devices. The carriages each carry on their upper face a roller 19 rotatably movable about axes orthogonal to the surface of the framework. The rollers 19 include an outer annular horizontal carrier 19a intended to support the outer edge of the lower face 14a of the disk to be controlled, and a second cylindrical centering carrier and radial locking means 19b cooperating with the outer cylindrical edge 14b.

By causing the carriages 18a, b, c to slide separately, it is possible to provide on the one hand the most accurate centering possible of the disk on the framework and on the other hand to provide locking of the disk by the three radial rollers. Furthermore, after locking of the carriages 18a, 18b, 18c, the rollers are rotated by second stepping motors 21, which enables rotation of the disk about itself on the framework 13.

The rotational drive of the rollers can thus be effected by the motors 20a with the aid of a conventional mechanical reversible clutch device which releases the drive screw of the carriages and engages a control bar and the gear train contained within the carriages.

The motorized carriages 18 which are provided with their rollers 19 themselves motorized thus constitute first radial support means for centering and for rotating the article.

Second securing and locating means 22 of the article on the framework are constituted by two elbowed arms 22b each pivoted on a respective base 22a which is rigid with a slide member 23 movable in translation in a slide 24 arranged on the inner vertical face of the longitudinal member 15b.

Each arm 22b of the locating means 22 is pivoted on its corresponding base 22a by means of a pin 25 and can be moved by a control actuator 22c disposed between the base 22a and the arm 22b and hydraulically connected to an external pressure source.

The free ends of the arms 22b carry idler rollers 26 so disposed that they can rotate about a common geometrical axis passing through the axis of rotation of the disk itself.

Figure 12:
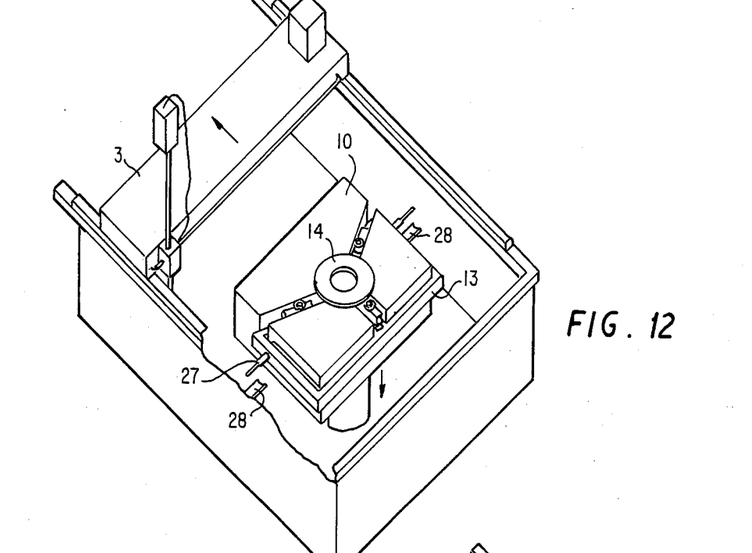
Figure 13:
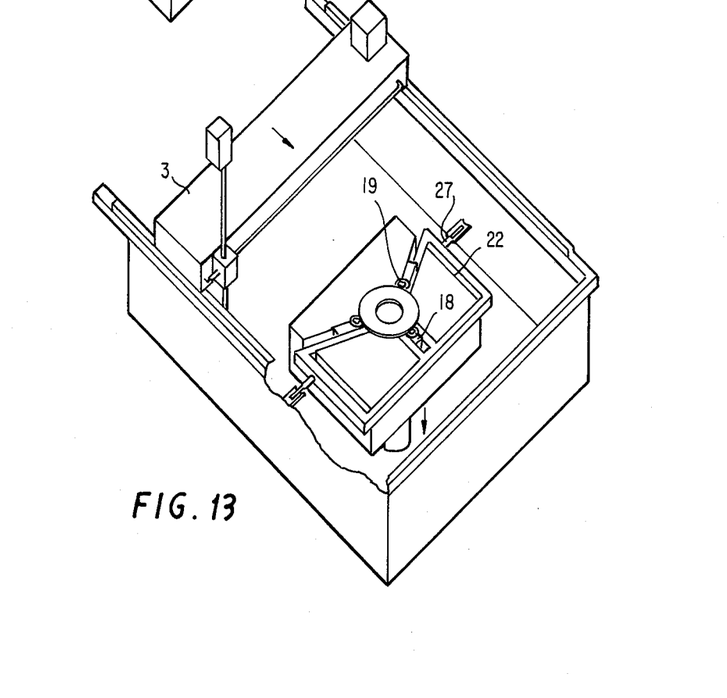

The arms 22 are mounted on movable slide members 23 in the slides 24 so they can be spaced and moved during the location of the disk on the framework, then returned and again brought towards one another and finally the arm 22b is lowered by means of the actuators 22c until the rollers 26 come into contact on the upper face 14c of the disk, thus holding it flat on the framework 13. The longitudinal members 15a and 15c of the framework 13 comprise two pivots 27 with horizontal axes perpendicular to the bisector of the free 120° sector of the framework and can cooperate with cradles 28 disposed as indicated in FIG. 12 within two opposed faces of the chamber 1 in order to support the framework 13 when the plate 10 is lowered.

The cradles 28 each comprise a semi-cylindrical carrier enabling rotation of the framework about pivots 27 and rotational drive means, for example grooves with parallel edges cooperating with a drive member of the pivots constituted, for example, by flats 27a of the pivots.

Through the intermediary of these rotational drive means, the framework 13 and the disk which it supports can be placed selectively in a horizontal or vertical location or in any angular inclined position between the horizontal and the vertical.

Locking indexes 29 (see FIGS. 14 and 15) are provided in one of the side walls of the chamber 1 carrying one of the cradles 28 in order to maintain one or the other location of the framework 13 inclined or horizontal or vertical and the disk which it supports.

The indexes 29 can be replaced by any equivalent means for effecting locking at discrete positions or any positions whatsoever, these means be constituted for example by pressure shoes providing for locking between the chamber and the framework.

The pivots 27 are arranged such that the axis of rotation of the framework, which they define pass through the axis of the article and in the vertical plane of the axes of the free rollers 26 such that the disk can be rotated on itself in all the angular positions assumed by the framework in order that the upper faces 14c, lower faces 14a and lateral faces 14b and 14d of the disk can be brought by rotation of the disk opposite to the free sector of the framework in order that each of the faces referred to can be scanned by the ultrasonic beam of the sensor 4 at one instant or another in one of the angular positions of the framework.

Thus, when the framework is horizontal, the sensor 4 can be placed opposite either the upper face, or the lateral faces of the disk, while in the vertical position of the framework, the sensor can be placed opposite either the lower face, or the lateral faces of the disk and this can happen without the disk having to be turned upside-down with respect to the framework.

The apparatus also comprises a gripping device 30 (FIG. 10) with radial grippers the structure of which can be substantially equivalent to that of the framework 13, the rollers 19 being replaced by prehensile grippers.

This device 30 can be carried by the gantry 3 and is thus movable longitudinally and transversely in a horizontal plane, while this degree of mobility is not essential for operating the apparatus.

When considering FIGS. 1 and 6 to 15, the sequence for placing the article in location (the disk 14) will now be explained.

In FIG. 1, a disk mounted on a pallet is conveyed by the supply rollers 9 onto the plate 10. In order to facilitate the rolling of the pallet on the plate, it is possible to provide upper slides of the chamber as well as on the upper face of the plate similarly carrying rollers parallel to the inlet rollers 9.

The frame 13 is placed in the bottom of the groove array 12 of which the height is calculated such that the uppe peripheries of the rollers 19 lie flush with the upper surface of the plate.

Furthermore, the rollers 19 are radially spaced apart. During this operation, the arms 22 are similarly spaced and lowered within the thickness of the framework 13 in order that they will not prevent the location of the pallet.

Figure 7:
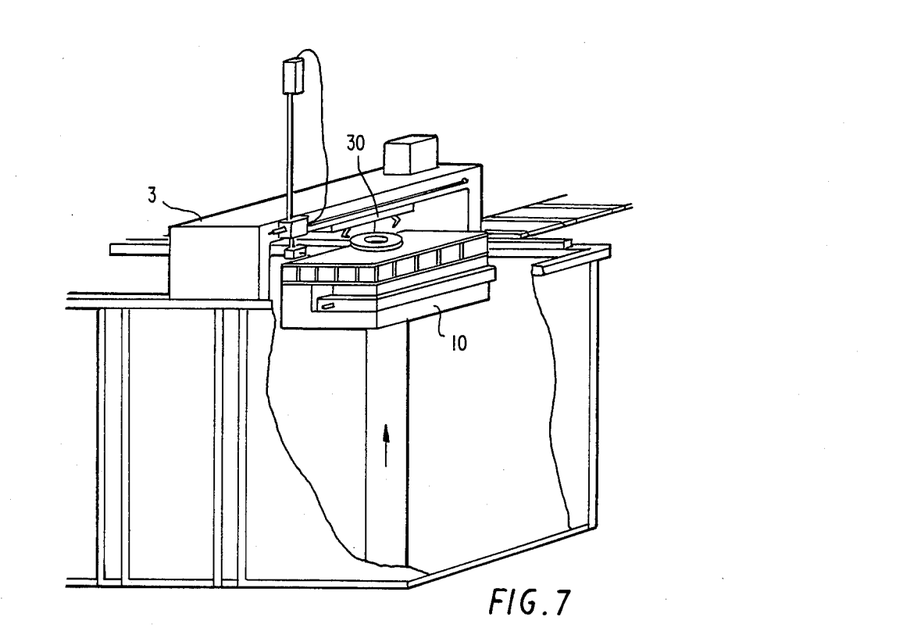
Figure 8:
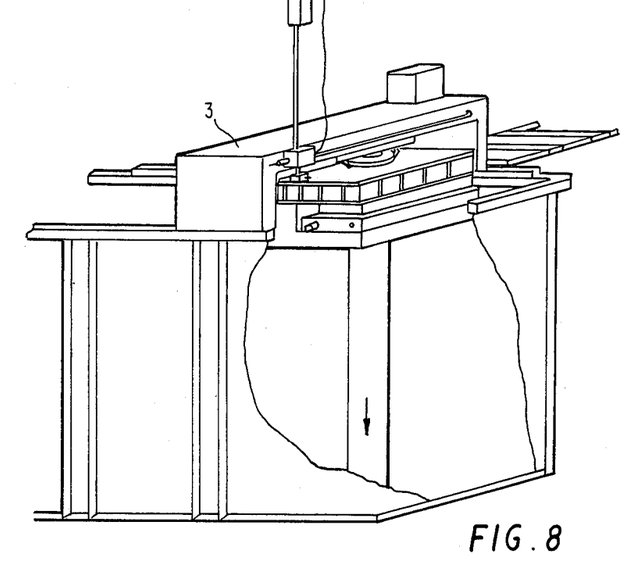
Figure 9:
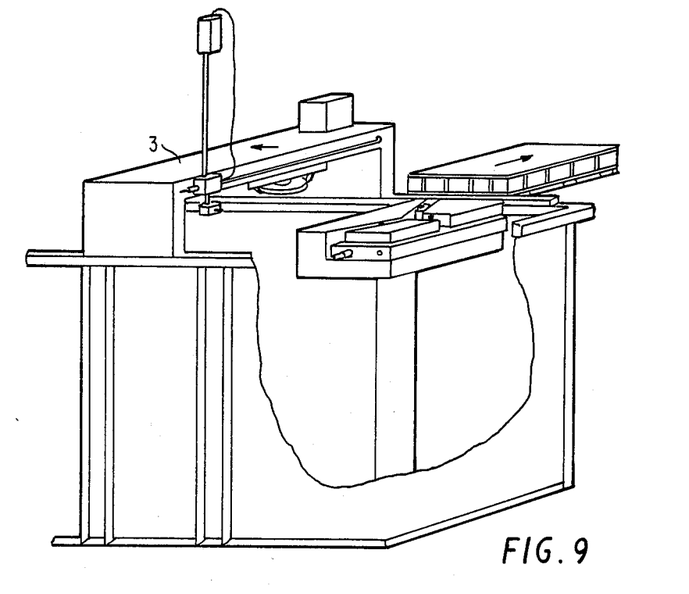

The gripping device, with the grippers being spaced radially, is placed (FIG. 6) above the plate in a position approximately centered with respect to the plate (FIG. 7). The plate 10 is then raised (FIG. 7) until the grippers of the gripping device 30 will be in position to enable engagement of the disk. The grippers are then moved inwardly and concentrically in order to engage the disk.

The disk being thus held by the gripping system, the plate 10 is lowered to its first position (FIG. 8) where, after disengagement of the gripping device carrying the disk, the pallet can be (FIG. 9) withdrawn by any means (for example a robot arm) to the supply rollers 9.

Figure 10:
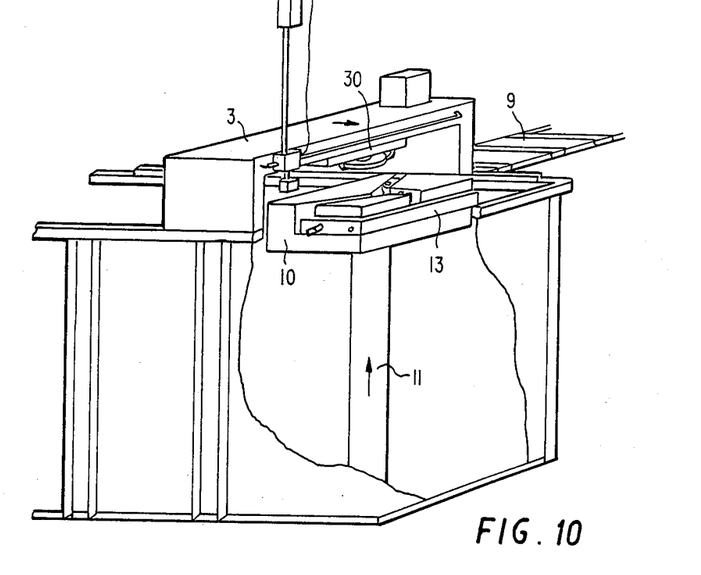
Figure 11:
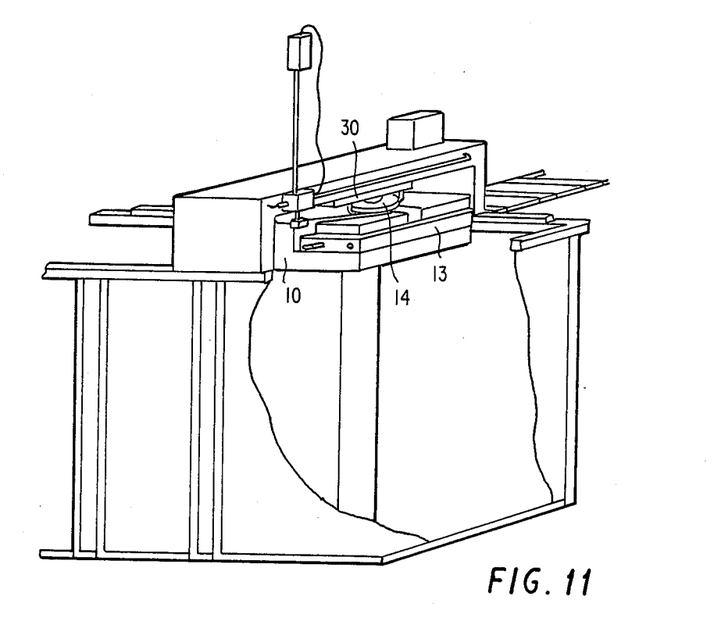

The gripping device, carrying the disk is then brought to the level of the plate (FIG. 10).

The plate 10 is then raised again until contact of the lower face of the disk (FIG. 11) and the grippers of the device 30 are then released. The disk is then loaded onto the upper face of the plate 10.

The plate carrying the disk is then lowered (FIG. 12). During the descent of the plate and arrival at the horizontal plane of the cradles 28, the movable carriages 18a, 18b, 18c are moved together to a suitable and predetermined position dependent upon the geometry of the disk in order to permit their locking and eventually rotation by contact with a lateral internal or external surface of the disk.

Figure 5:
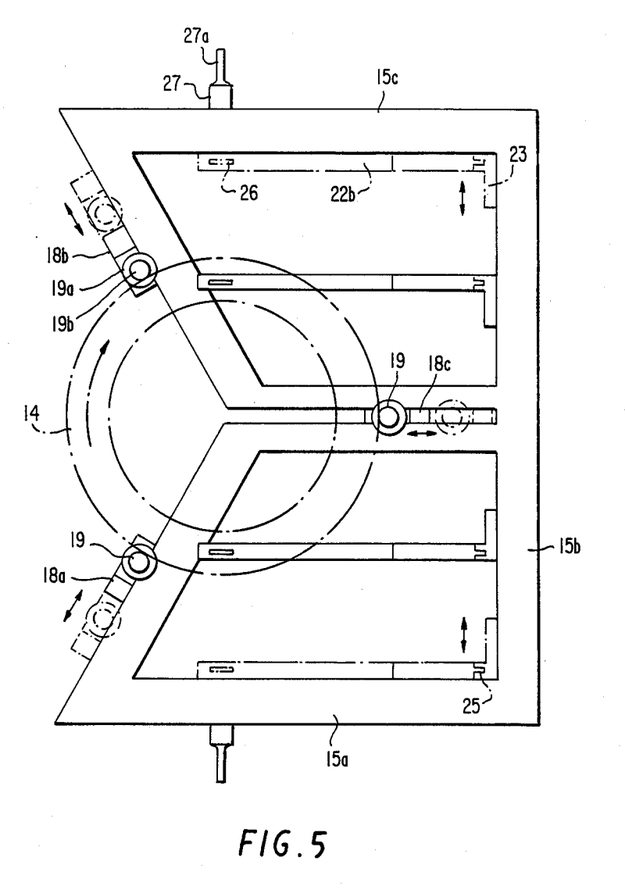
FIG. 5 illustrates the framework carrying the article, as an inverted plan view.
Figure 6:
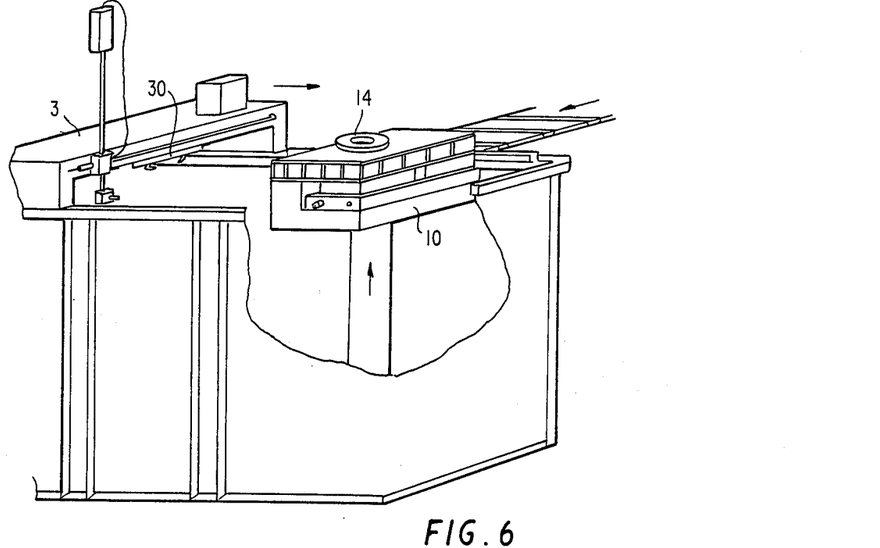
FIGS. 6 to 15 illustrate successive stages in a sequence of operating on an article.

The framework 13, which has a tendency to raise itself with respect to the plate 10 during the descent of the latter and location of the framework on the cradles 28, sees its rollers 19 emerging from the upper surface of the plate while it continues to approach the disk. The movement of the rollers is terminated (FIGS. 13 and 14) when the disk is supported by the annular carriers 19a (FIG. 5) of the rollers and the cylindrical carriers 19b are in contact with one of the outer lateral faces 14b or internal faces 14d of the disk.

Figure 14:
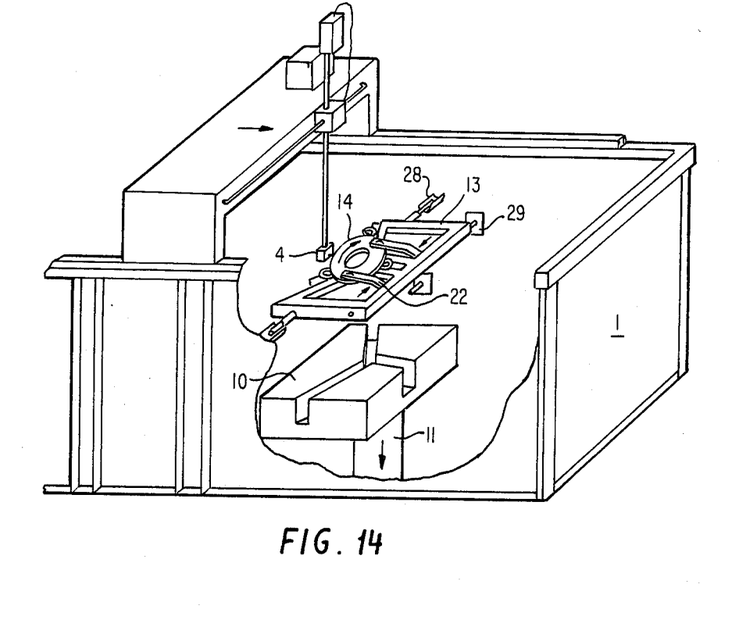
Figure 15:
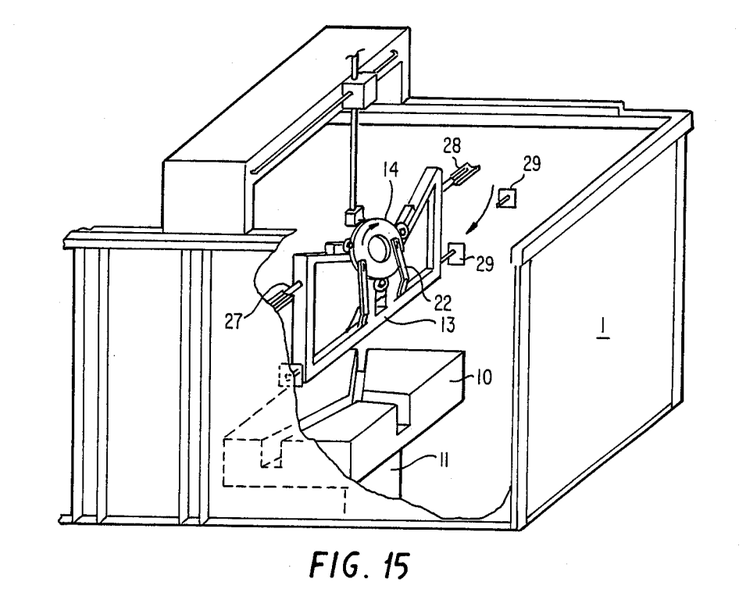

At this instant, the framework 13 is wholly supported by the pivots 27 within the cradles 28 of the support and the plate 10 can be lowered to its rest position (FIG. 14). The second securing and location means 22 of the disk can then be placed in the working locations as has been explained hereinbefore.

The sensor 4 which during all the previous operations was inoperative, can then be brought up to the lateral and upper faces of the disk for the operation of monitoring the condition of these faces. These are displayed by rotation of the disk about its own axis by means of the rollers 19.

Before the monitoring of the lower face 14a, the sensor is initially spaced to enable rotation of the framework within the cradle until it reaches its vertical location (FIG. 15) where it is blocked by means of one of the index members 29.

The sensor is then brought up to the underface 14a through the open sector of the framework 13.

The whole of the surface 14a can be sensed since the disk held by the rollers and the arms 22 can continue rotation about its own axis.

A corresponding and programmed action of displacement and of orientation of the transducer unit together with the rotation of the framework carrying the article enable advantageously a continuous following of the profile and the monitoring of articles of more complex geometry.

When the monitoring is completed, the manipulation operations referred to can be effected in the reverse order from those which have just been described in order to reload the disk onto the transport pallet.

By means of the invention, it is thus possibly completely to automate the monitoring operation, and to carry this out the control of the various stepping motors, actuators and gripping means is integrated within a single control device, programmed in dependence upon the geometry of the article to be monitored in order to effect sequentially all the operations of manipulation and of monitoring for flaws, defects and dimensional precision.

Furthermore, all manual intermediate operations are omitted and the operating controller can to occupy the entirety of his time in the primary monitoring function, namely the interpretation of the results, if the acquisition and the treatment of the monitoring signals does not in itself enable an automatic diagnostic function.

Finally the invention is applicable not only to monitoring for flaws but also to measurement operations with or without contact or to machining such for example of punching, boring, localized heat treatment, surface treatment etc. the bench and the measurement chamber being then replaced by appropriate machine tools.

The invention is also applicable in a general manner to all operations on an article, necessitating the total covering of the whole lateral surface of an article at a treatment device with or without contact.

Obviously, numerous modifications and variations of the present invention are possible in light of the above teachings. It is therefore to be understood that within the scope of the appended claims, the invention may be practiced otherwise than as specifically described herein.

What is claimed is:

1. Apparatus for mounting and for locating an article where the article can be subjected to monitoring, inspection, measurement or machining at angularly spaced locations, said apparatus comprising
   fixed support means carrying
      cradle means,
   gantry means movable relative to the fixed support means, including
      gripper means mounted on the gantry means and movable horizontally in two orthogonal directions,
   horizontal plate means,
   drive means mounting the horizontal plate means for vertical motion relative to the fixed support means,
   framework means for mounting and orientating the article to be monitored, the framework means having an opening to facilitate access to the article by monitoring means and including
      first support and radially-acting means for centering and rotating the article when mounted on the framework, and
      second securing and locating, means for the the article, said second means being adapted to contact one face of the article, the arrangement being such that vertical movement of the plate means can be effected between
         a first location where the plate means equipped with the framework means can receive a pallet carrying the article to be monitored,
         a second, upper, location where the article is engaged by the gripper means, the plate means being subsequently moved to the first location where the pallet is withdrawn from the plate means,
         a third location where the framework rests on said cradle means, and
         a fourth, rest location where the framework is removed from the plate means.

2. An apparatus according to claim 1 wherein the framework means comprises
   three radial traverses angularly spaced by 120° and forming slides of said first radial support means, and
   longitudinal members forming three sides of a rectangle, the fourth side being without a longitudinal member and thus leaving an angular sector substantially equal to 120° of arc which is left free in order to bring into contact one or other of the faces of the article mounted on the framework with monitoring means, the outer ends of said travereses being rigid with the longitudinal members.

3. An apparatus according to claim 2, wherein the first support means comprise
   three carriages movable radially in slides carried by vertical faces of the traverses of the framework, said carriages each carrying a roller rotatable about an axis orthogonal to the general plane of the framework.

4. An apparatus according to claim 3, wherein each movable carriage comprises independent drive means for displacement along its slide and means for locking the carriage in a selected position on the slide.

5. An apparatus according to claim 4, wherein each roller of the radial support means comprises a first annular plane seating, orthogonal to the axis of rotation of the roller, said seating supporting the outer edge of the lower face of the article to be monitored and a second, cylindrical seating for centering and radially locking the article cooperating with the outer cylindrical edge of the article under the action of the displacement drive means of the corresponding carriage.

6. An apparatus according to claim 5, comprising three synchronously-controlled stepping motors for driving the respective rollers, the articles being rotated on the framework on the rollers.

7. An apparatus according to claim 1, wherein the second means for the securing and the location of the article on the framework comprises
two arms,
two slides and
a control actuator,
the arms being pivoted to a respective said slide at one end, the other end of each arm contacting one surface of the article under the action of the control actuator.

8. An apparatus according to claim 7, comprising a slide member rigid with one said longitudinal member opposite to the opening of the framework, the slides being movable from a first position where they are spaced from the surface of the article, to a second position where they lie above the article.

9. An apparatus according to claim 8, wherein the end of each arm has a freely rotatably roller for contacting the upper face of the article, the two rollers being diametrically opposed with respect to the axis of rotation of the article when the arms are in contact with the latter.

10. An apparatus according to claim 3, wherein the plate means has on its upper face a recess cooperating with the lower surface of the longitudinal members and the traverses of the framework in order to position the latter on the plate means, the depth of the recess being such that the rollers lie flush with the upper surface of the plate means.

11. An apparatus according to claim 2, wherein the framework comprises two pivots with horizontal axes disposed on one side and on the other side of the framework on a straight line orthogonal to the bisector of the said open sector, and cooperating with the cradle means to enable rotation of the framework and the article mounted therein from a horizontal position to a vertical position.

12. An apparatus according to claim 11, wherein the cradle comprises rotary drive means cooperating with at least one drive member of the pivots of the framework.

13. An apparatus according to claim 11 or 12, wherein the fixed support comprises at least two index members for locking the framework in at least two positions angularly spaced from one another.

14. An apparatus according to claim 1, comprising control means for the displacement of and the orientation of a monitoring means for orientation of the framework and rotation of the article on the framework in order to effect the continuous following of the profile of the article by the monitoring means.

* * * * *

UNITED STATES PATENT AND TRADEMARK OFFICE
CERTIFICATE OF CORRECTION

PATENT NO. : 4,787,814

DATED : NOVEMBER 29, 1988

INVENTOR(S) : JEAN F. VAERMAN

PAGE 1 OF 3

It is certified that error appears in the above-identified patent and that said Letters Patent is hereby corrected as shown below:

In column 1, line 10, change "palette" to --pallet--;

line 13, change "other" to --another--;

line 15, change "find" to --finds--;

line 17, change "ultra-sonic" to --ultrasonic--;

line 28, change "are" to --is--;

line 33, change "surveillence" to --surveillance--.

In column 2, line 13, change "support-" to --support--;

line 19, after "monitoring" insert --,--;

line 21, change "other" to --another--;

line 51, change "traverse" to --traverses--.

UNITED STATES PATENT AND TRADEMARK OFFICE
CERTIFICATE OF CORRECTION

PATENT NO. : 4,787,814

DATED : NOVEMBER 29, 1988

INVENTOR(S) : JEAN F. VAERMAN

It is certified that error appears in the above-identified patent and that said Letters Patent is hereby corrected as shown below:

In column 3, line 8, change "tool of" to --tool or--;

line 12, change "an" to --a--;

line 18, change "orientationsspaced" to --orientations spaced--.

In column 4, line 11, change "roll" to --rolled--;

line 25, change "centre" to --center--; also change "on to" to --onto--;

line 45, change "120°C" to --120°--;

line 46, change "centre" to --center--;

In column 5, line 4, change "b, c" to --18b, 18c--;

line 68, change "whatsoever, these" to --whatsoever. These--; also after "means" insert --may--.

UNITED STATES PATENT AND TRADEMARK OFFICE
CERTIFICATE OF CORRECTION

PATENT NO. : 4,787,814           PAGE 3 OF 3
DATED      : NOVEMBER 29, 1988
INVENTOR(S): JEAN F. VAERMAN

It is certified that error appears in the above-identified patent and that said Letters Patent is hereby corrected as shown below:

In column 6, line 4, change "pass" to --passes--;

line 41, change "uppe" to --upper--.

In column 7, line 20, change "locations" to --location--;

line 59, delete "to".

In column 8, line 35, change "locating, means for the" to --locating means for--;

line 63, change "travereses" to --traverses--.

In column 9, line 19, change "articles" to --article--;

line 20, change "framework on" to --framework by--.

In column 10, line 2, change "rot

Signed and Sealed this

Thirtieth Day of May, 1989

Attest:

DONALD J. QUIGG

Attesting Officer      Commissioner of Patents and Trademarks